M. A. SHOTWELL.
TIRE COVER OR PROTECTOR.
APPLICATION FILED JAN. 7, 1920.
1,352,093.
Patented Sept. 7, 1920.
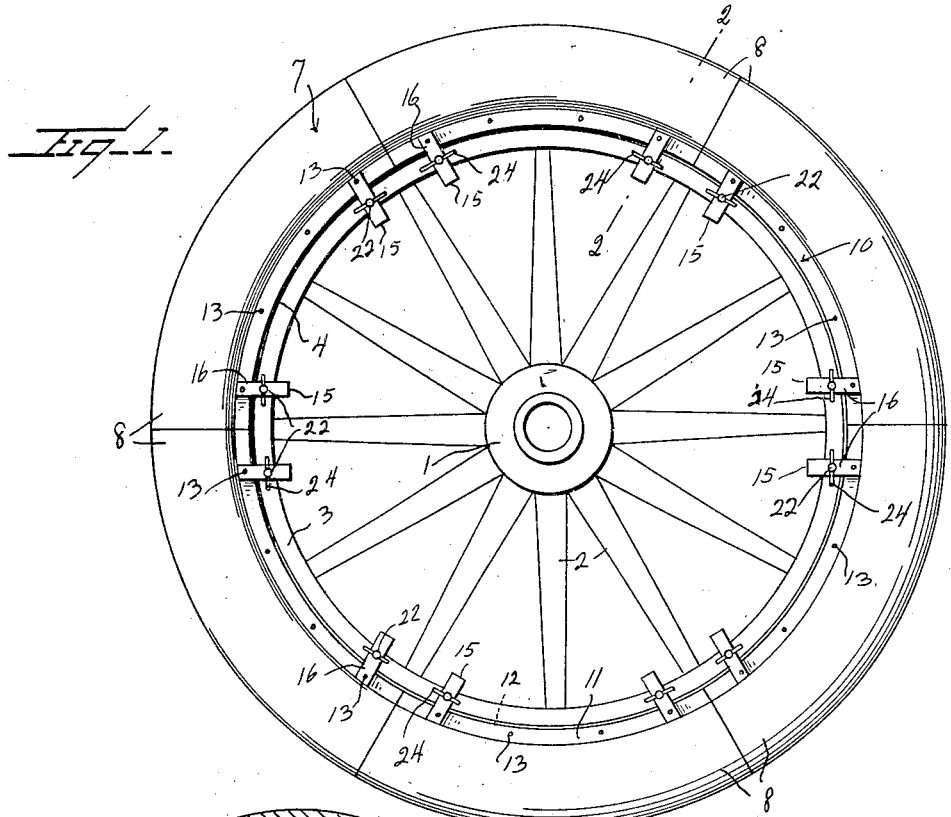
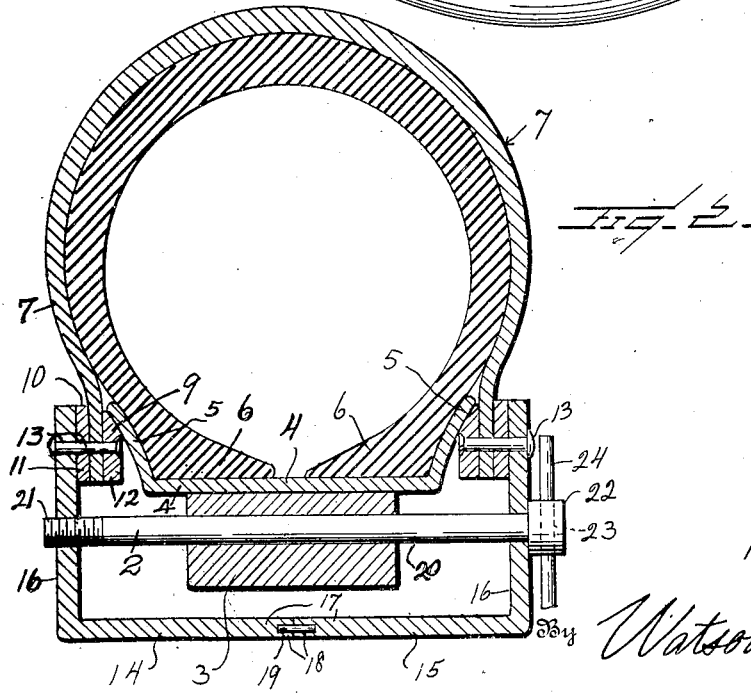
Inventor
M. A. Shotwell
By Watson E. Coleman
Attorney

UNITED STATES PATENT OFFICE.

MARCUS A. SHOTWELL, OF MIAMI, FLORIDA.

TIRE COVER OR PROTECTOR.

1,352,093. Specification of Letters Patent. Patented Sept. 7, 1920.

Application filed January 7, 1920. Serial No. 349,885.

*To all whom it may concern:*

Be it known that I, MARCUS A. SHOTWELL, a citizen of the United States, residing at Miami, in the county of Dade and State of Florida, have invented certain new and useful Improvements in Tire Covers or Protectors, of which the following is a specification, reference being had to the accompanying drawings.

This invention relates to an improved tire cover or protector and particularly to the retaining means therefor, and an object of the invention is to cover the tire and protect the same, said cover being thick enough to prevent tacks or other sharp pieces from reaching the tread surface of the tire, thereby preventing the same from being punctured.

Another object of the invention is to provide a cover or protector constructed from some suitable heavy and tough material, such as leather of considerable thickness, or canvas consisting of several plies, or a composition of canvas, or any other material which is not very easily penetrable by a sharpened piece, tack or the like to protect the tread surface of the tire.

A further and most important object of the invention is the provision of an improved retaining means for the cover (which is constructed in sections) comprising ring plates connected to the opposite sides of the cover, in combination with clamps likewise riveted to the ring plates and arching the inner part of the felly of the wheel, to retain the cover or protector in position, in combination with means passing through the clamps and through the felly to secure the clamps in position relatively to the felly and the rim.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of a wheel, showing the application of the improved tire cover or protector, the same being constructed in accordance with the invention, and Fig. 2 is a sectional view on line 2—2 of Fig. 1.

Referring more especially to the drawings, 1 designates the usual hub of the wheel, 2 the spokes and 3 the felly to which the spokes are connected in the usual manner.

A rim 4 is in surrounding relation to the felly, and is adapted to be forced on and into engagement with the felly, as shown in Fig. 2. This rim may be fastened to the felly in any suitable manner (not shown) and may be secured to the felly by friction, if desired.

The rim 4 is provided with tire engaging flanges 5, which are engaged by the flanged parts 6 of the tire, as shown in Fig. 2. A cover or protector 7, which may be constructed of any puncture proof material, comprises a plurality of segment sections 8. These sections 8 of the cover or protector engage over the tire, particularly the tread part, and are arranged as shown in Fig. 1, the adjacent end edges abutting.

Inner and outer ring plates 9 and 10 are provided, and these ring plates 9 and 10 comprise a plurality of sections 11 and 12, which are secured to the sections of the tire cover or protector by means of rivets or the like 13. In order to secure the sections of the ring plates and sections of the tire cover in position on the tire, clamps 14 and 15 are employed. These clamps are angular in cross section, and are arranged at intervals with relation to the felly of the wheel, and located between the spokes. The radial arms 16 of the clamps are secured by the rivets 13 to the outer sections of the ring plate 10. The adjacent end edges of the parts 17 of the clamps are provided with cavities or cylindrical bores 18 which receive the dowel pins 19, by means of which the angular clamps are held in position relatively to each other. By means of the dowel pins, the clamps are held relatively rigid, and when so arranged, each pair of angular clamps constitute a U-shaped member to arch the inner portion of the felly, as shown clearly in Fig. 2 acting to retain the ring plates in position relatively to the rim 4 of the wheel.

In order to secure the clamps in position relatively rigid to the rim, suitable bolts 20 are passed through the arms 16 of the clamps 15, and through the felly, and have their other ends threaded at 21 into the arms 16 of the clamps 14. These bolts 20 are arranged between the spokes of the wheel, and close to every other spoke of the wheel. The heads 22 of the bolts may be of any suitable shape, preferably cylindrical as shown, and are provided with transversely disposed openings 23, which receive pins 24. These pins may be held frictionally in the openings 23, or there may be but only one pin, and capable of being inserted through the opening 23 of each head so as to tighten up the bolts. In other words, it may be the aim that the pins 24 are not to be carried by the heads, but only to be used to tighten up the bolts, and in this case only one pin will be necessary. However, the heads of the bolts each carry a pin. In applying the cover to the tire, the sections of the cover are placed over the tire as shown in Figs. 1 and 2, in which case the sections of the ring plates will be positioned adjacent the flanges of the rim. As each section of the cover is placed in position, the clamps 14 and 15 are arranged so that the adjacent end edges of their arms 17 will engage. The dowel pins 19 will engage the bores or the depressions 18, after which the bolts may be tightened up by turning the transverse pins 24. The threaded ends of the bolt will feed through the arms 16 of the clamps 14 and both sets of clamps will be drawn tightly in to position, forcing the sections of the ring plates 9 in close contact with the flanges 5 of the rim. The other sections of the cover will be applied in a similar manner until the entire tread surface of the tire will be covered and protected. The cover may be constructed of any suitable puncture proof material, and may be constructed of very heavy tough leather, or of heavy plies of canvas or a composition thereof.

The invention having been set forth, what is claimed as new and useful is:—

1. In a tire cover or protector comprising segmental cover sections engaging over the tread and adjacent the sides of the tire, right angle clamps disposed with relation to the felly of the wheel, whereby certain of their arms are positioned radially and spaced from the opposite sides of the felly and other of their arms positioned in spaced parallel planes with the inner cylindrical surface of the felly, the radial arms being connected to the ends of the cover section, means connecting the adjacent ends of the arms which are disposed in a plane parallel with the inner surface of the felly, bolts passing through the felly and adjustably connecting the radial arms of the right angle clamps for adjusting the same and regulating the clamping action of the clamps, whereby the clamps may give with respect to the felly.

2. In a tire cover or protector comprising a segmental cover section engaging over the tread and adjacent the sides of the tire, right angle clamps disposed with relation to the felly of the wheel, whereby certain of their arms are positioned radially with respect to the wheel and other of their arms positioned in a plane parallel with the inner cylindrical surface of the felly, dowel pins connecting the adjacent ends of the arms which are disposed in a plane parallel with the inner surface of the felly, the radial arms being connected to the ends of the cover section, said clamps being spaced from the opposite sides and from the inner cylindrical surface of the felly, whereby the clamps may give with respect to the felly, in order to withstand the strains on the cover section, bolts passing through the radial arms of the right angle clamps and through the felly, said bolts having threaded connections with the radial arms of certain of the clamps, means on the bolts opposite their threaded connections for adjusting the same and regulating the clamping action of the clamps.

In testimony whereof I hereunto affix my signature.

MARCUS A. SHOTWELL.